(12) United States Patent
Bartling

(10) Patent No.: US 11,187,593 B2
(45) Date of Patent: Nov. 30, 2021

(54) CURRENT-BASED TEMPERATURE MEASUREMENT DEVICES AND METHODS

(71) Applicant: Microchip Technology Incorporated, Chandler, AZ (US)

(72) Inventor: James E. Bartling, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 366 days.

(21) Appl. No.: 16/176,118

(22) Filed: Oct. 31, 2018

(65) Prior Publication Data

US 2019/0128748 A1 May 2, 2019

Related U.S. Application Data

(60) Provisional application No. 62/580,760, filed on Nov. 2, 2017.

(51) Int. Cl.
| | | |
|---|---|---|
| *G01K 7/00* | (2006.01) | |
| *G01K 7/34* | (2006.01) | |
| *G01K 1/02* | (2021.01) | |
| G05F 3/10 | (2006.01) | |

(52) U.S. Cl.
CPC ............... *G01K 7/34* (2013.01); *G01K 1/028* (2013.01); *G05F 3/10* (2013.01)

(58) Field of Classification Search
USPC ................................ 374/170, 184; 327/512
See application file for complete search history.

(56) References Cited

U.S. PATENT DOCUMENTS

| | | | | |
|---|---|---|---|---|
| 6,078,208 A | * | 6/2000 | Nolan ...................... | G01K 7/01 327/512 |
| 6,869,216 B1 | * | 3/2005 | Holloway .............. | G01K 1/028 341/143 |
| 7,969,223 B1 | | 6/2011 | Gilbert ........................ | 327/350 |
| 2004/0104763 A1 | | 6/2004 | Pai ............................... | 327/539 |
| 2004/0239303 A1 | * | 12/2004 | Feng ......................... | G05F 3/30 323/313 |
| 2007/0195856 A1 | * | 8/2007 | Blom ...................... | G01K 7/01 374/117 |

(Continued)

FOREIGN PATENT DOCUMENTS

| | | | | |
|---|---|---|---|---|
| CN | 102236359 A | 11/2011 | ............... | G05F 3/16 |
| CN | 102486414 A | 6/2012 | ............... | G01K 7/00 |
| CN | 102865943 A | 1/2013 | ............... | G01K 7/34 |

OTHER PUBLICATIONS

International Search Report and Written Opinion, Application No. PCT/US2018/058833, 15 pages, dated Feb. 18, 2019.

(Continued)

*Primary Examiner* — Mirellys Jagan
(74) *Attorney, Agent, or Firm* — Slayden Grubert Beard PLLC

(57) ABSTRACT

A Proportional-To-Absolute-Temperature (PTAT) current source is used for high-resolution temperature measurement. The PTAT current source is coupled to a capacitor for a fixed amount of time so as to charge the capacitor to a voltage which is proportional to the current applied to the capacitor, and thus proportional to the temperature. The voltage on the capacitor is measured, and a temperature is calculated or determined from the measured voltage.

22 Claims, 1 Drawing Sheet

(56) References Cited

U.S. PATENT DOCUMENTS

| | | | |
|---|---|---|---|
| 2013/0259091 A1* | 10/2013 | Chen | G01K 7/34 374/184 |
| 2013/0272341 A1 | 10/2013 | Lee et al. | 374/184 |
| 2014/0211905 A1 | 7/2014 | Chuang et al. | 377/25 |
| 2014/0269839 A1 | 9/2014 | Tai et al. | 374/184 |
| 2014/0333330 A1* | 11/2014 | Tai | G01R 27/2605 324/679 |
| 2015/0003490 A1* | 1/2015 | Ash | G01K 7/01 374/1 |
| 2015/0180486 A1* | 6/2015 | Shanan | H03L 7/099 327/156 |
| 2016/0164529 A1* | 6/2016 | Nakamura | H03L 7/02 327/158 |
| 2017/0016776 A1 | 1/2017 | Ma et al. | 374/178 |
| 2017/0255220 A1* | 9/2017 | Sivakumar | H03K 3/011 |
| 2018/0328792 A1* | 11/2018 | Zhu | G01K 7/34 |
| 2020/0117147 A1* | 4/2020 | Mercier | H03M 1/50 |

OTHER PUBLICATIONS

Chinese Office Action, Application No. 201880056424.6, 18 pages, dated Jan. 12, 2021.
Chinese Office Action, Application No. 201880056424.6, 21 pages, dated Aug. 6, 2021.

* cited by examiner

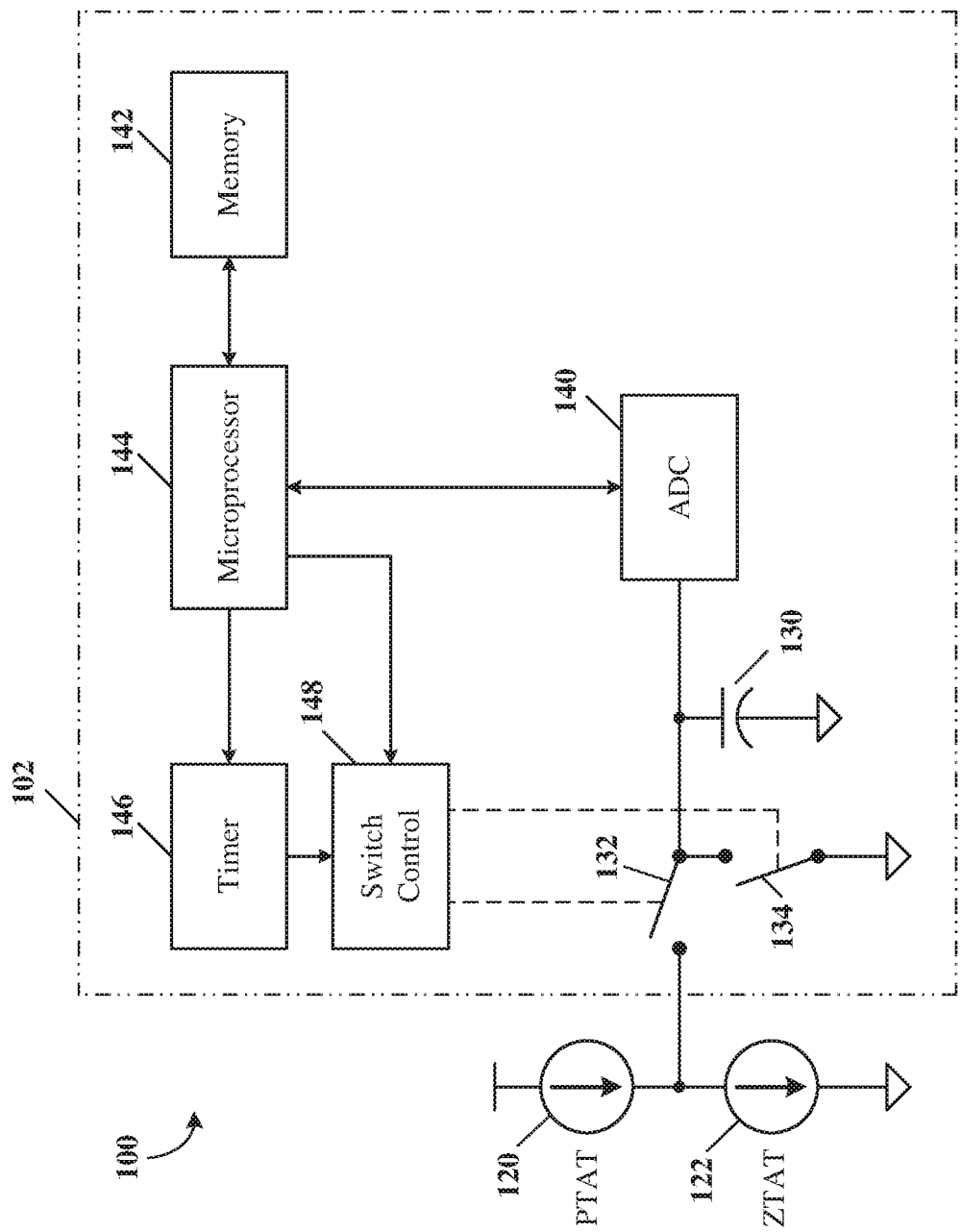

CURRENT-BASED TEMPERATURE MEASUREMENT DEVICES AND METHODS

RELATED PATENT APPLICATION

This application claims priority to commonly owned U.S. Provisional Patent Application Ser. No. 62/580,760; filed Nov. 2, 2017; entitled "Current-Based Temperature Measurement Devices and Methods," by James E. Bartling, and is hereby incorporated by reference herein for all purposes.

TECHNICAL FIELD

The present disclosure relates to temperature measurement devices and methods, and more particularly, to current-based temperature measurement devices and methods, e.g., using a Proportional to Absolute Temperature (PTAT) current source for temperature measurement.

BACKGROUND

Various electronic techniques are used for temperature measurement. For example, some devices or techniques employ resistor-based temperature measurement, e.g., by driving a resistor with a fixed current source, measuring the voltage across the resistor, and determining a temperature value as a function of the measured voltage. However, resistor-based techniques often have limited accuracy and/or limited speed of conversion.

As another example, a resistor divider technique may be used for temperature measurement, e.g., by using resistors in the divider circuit with different known temperature coefficients. However, this technique typically suffers from slow response time, limited accuracy, and/or linearity issues.

As yet another example, some devices or techniques employ a diode-based temperature measurement, e.g., by driving a diode with a fixed current source, measuring the voltage across the diode, and determining a temperature value as a function of the measured voltage. However, diode-based techniques often suffer from slow response time, limited accuracy, and/or low resolution.

SUMMARY

Therefore, what is needed is an accurate, fast, reliable and low-cost way of measuring temperature.

According to an embodiment, a temperature measurement system may comprise: a proportional to absolute temperature (PTAT) current source; a capacitor selectively coupled to the PTAT current source by a controllable switch; a controller configured to control the switch to couple the capacitor to the PTAT current source for a charging time, wherein the capacitor may be charged to a voltage during the charging time; an analog-to-digital converter (ADC) having an input coupled to the capacitor, and configured for generating a digital representation of the voltage on the capacitor; and an electronic circuit configured to calculate a temperature based on the digital representation of the voltage on the capacitor.

According to a further embodiment, a zero change to absolute temperature (ZTAT) current sink may be configured for adjusting a capacitor charging current to a desired value. According to a further embodiment, PTAT and ZTAT currents may be created by band gap circuits. According to a further embodiment, a current mirror may be provided to increase the current available from the PTAT current source. According to a further embodiment, a current mirror may be provided to adjust a temperature coefficient of the PTAT current source. According to a further embodiment, a current mirror may be provided to increase the current handling of the ZTAT current sink.

According to a further embodiment, the temperature measurement system may have a temperature measurement resolution selected from any one of the group consisting of less than 1° C., less than 0.5° C., less than 0.2° C., less than 0.1° C., and less than 0.05° C. According to a further embodiment, the charging time may be selected from any one of the group consisting of less than 1 second, less than 100 milliseconds, less than 10 milliseconds, less than 1 millisecond, less than 100 µs, less than 10 µs, less than 1 µs, and less than 100 ns. According to a further embodiment, the charging time may be about 625 ns.

According to a further embodiment, the temperature measurement system may comprise a microcontroller. According to a further embodiment, the microcontroller may comprise: a microprocessor; a memory coupled to the microprocessor and storing a program for determining the temperature from the digital representation of the voltage on the capacitor. According to a further embodiment, the microcontroller may comprise the ADC and the controllable switch. According to a further embodiment, a shorting switch may be provided to discharge the capacitor before charging during the charging time. According to a further embodiment, the controller controls the shorting switch.

According to another embodiment, a method for measuring temperature may comprise the steps of: providing a current from a proportional to absolute temperature (PTAT) current source; charging a capacitor with the current from the PTAT current source for a charging time; measuring a voltage on the capacitor after the charging time; and converting the measured voltage to a temperature.

According to a further embodiment of the method, the step of converting the measured voltage to a temperature may comprise the steps of: determining a reference voltage on the capacitor, wherein the reference voltage may be equal to the current from the PTAT current source at a certain temperature multiplied by the charging time divided by a capacitance of the capacitor; determining a current/temperature slope of the PTAT current source; converting the current/temperature slope to a voltage/temperature slope over the charging time; and calculating the temperature from the reference voltage and the voltage/temperature slope.

According to a further embodiment of the method, the step of adjusting the capacitor charging current to a desired value may be done with a zero change to absolute temperature (ZTAT) current sink. According to a further embodiment of the method, the step of increasing the current from the PTAT current source may be done with a mirror current source. According to a further embodiment of the method, the step of increasing the temperature coefficient of the PTAT current source may be done with a mirror current source.

According to yet another embodiment, an apparatus for measuring temperature may comprise: a microcontroller comprising a microprocessor with memory, an analog-to-digital converter (ADC) having an output coupled to the microprocessor, a capacitor coupled to an input of the ADC, a first switch coupled between a first node and the capacitor, a second switch coupled between the capacitor and a common voltage (ground), a switch controller coupled to the microprocessor and the first and second switches, and a timer coupled to the microprocessor; and a proportional to absolute temperature (PTAT) current source coupled between a supply voltage and the first node; wherein the first switch closes for a certain time then opens; the ADC measures a voltage on the capacitor after the certain time; and the microprocessor converts the measured voltage to a temperature.

According to a further embodiment, the second switch may close and may discharge the capacitor before the first switch closes. According to a further embodiment, a zero change to absolute temperature (ZTAT) current sink may be configured for adjusting a charging current to the capacitor.

BRIEF DESCRIPTION OF THE DRAWINGS

A more complete understanding of the present disclosure may be acquired by referring to the following description taken in conjunction with the accompanying drawing wherein:

FIG. 1 illustrates a schematic block diagram of a PTAT based temperature measurement system, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

Example aspects of the present disclosure are described below in conjunction with FIG. 1, which shows an example system for temperature measurement using a PTAT current source, according to an example embodiment.

Embodiments of the present disclosure provide systems, devices, and methods for providing high-resolution temperature measurement using a Proportional-To-Absolute-Temperature (PTAT) current source. Some embodiments use a PTAT current source to charge a capacitor for a fixed amount of time to impose a voltage on the capacitor which is proportional to the current, and thus proportional to the temperature of the PTAT which may be substantially the same as the temperature surrounding it. This voltage can be measured, and a temperature can be calculated or determined from the measured voltage.

Some embodiments utilize analog signals created by a band gap. For example, a band gap can be designed to create a reference voltage that is stable across temperature. In addition, a band gap can create three basic currents:

1. PTAT—Proportional to Absolute Temperature. The PTAT provides a current that has a linear relationship to the current.
2. ZTAT—Zero change to Absolute Temperature. The ZTAT provides a current that is stable and does not change with temperature. This current may be used to adjust the offset of the temperature measuring circuit to the desired value, as more fully disclosed hereinbelow.
3. NTAT—Negative proportional to Absolute Temperature. The NTAT provides a current that has a negative coefficient with respect to temperature.

Some embodiments of the present invention, e.g., the example shown in FIG. 1 discussed below, utilize the PTAT and ZTAT currents produced by a band gap, for the purpose of providing a high-resolution temperature measurement. For example, some embodiments may use the ZTAT to adjust the offset to the desired PTAT value, as discussed below. A current mirror circuit may be used in combination with the bandgap to provide a PTAT and/or ZTAT with higher current capacity and to adjust the operating current of the PTAT and/or ZTAT. Also, a current mirror circuit may provide adjustment for the change in current per degree of temperature, e.g., the slope microamperes per degree Celsius ($\mu A/°C$). The delta temperature change per degree Celsius and Kelvin is the same and will be used interchangeable herein.

Referring now to the drawing, the details of example embodiments are schematically illustrated. Like elements in the drawings will be represented by like numbers, and similar elements will be represented by like numbers with a different lower-case letter suffix.

Referring to FIG. 1, depicted is a schematic block diagram of a PTAT based temperature measurement system, according to a specific example embodiment of this disclosure. FIG. 1 shows an example temperature measurement system, generally represented by the numeral 100, for temperature measurement using PTAT and ZTAT current sources, e.g., produced by a band gap, according to an example embodiment. The temperature measurement system 100 may comprise a PTAT current source 120, a ZTAT current sink 122, a capacitor 130, switches 132 and 134, an analog-to-digital converter (ADC) 140, a microprocessor 144, a memory 142, a timer 146, and a switch control 148. All of the aforementioned components, except for the PTAT 120 and ZTAT 122, may be provided in a microcontroller 102. It is contemplated and within the scope of this disclosure that current mirrors may be used to increase the current output/sinking of the PTAT 120 and/or ZTAT 122, as well as the amount of current supplied/sunk from each device. In addition, the current change to temperature change (current/temperature transfer slope) may be adjusted with an associated current mirror.

The microprocessor may instruct the switch control 148 to open switch 132 and close switch 134 to zero out the charge on the capacitor 130, then open switch 134 thereafter. The microprocessor may instruct the timer 146 to start and the switch 132 to close, then open the switch 132 when the timer 146 times out. This provides a precision charge time of the capacitor 130 which stores a voltage. The ADC 140 converts this voltage to a digital value that is provided to the microprocessor 144. The microprocess 144 is controlled by a program in the memory 142 that may be used to convert the digital value of the capacitor voltage to a temperature. The ZTAT current sink 122 may be utilized as an offset for adjusting the charging current to the capacitor 130 to a desired value (diverting excess current from the PTAT).

Capacitor 130 may be integrated with, or separate from, a sample and hold capacitor associated with the ADC 140. Switch 132 may be controlled by suitable control electronics, e.g., microprocessor 144, timer 146 and switch control 148, to close switch 132 at $T_1$ and open switch 132 after some predefined duration (e.g., determined by the timer 146) at $T_2$, such that capacitor 130 is charged during a charge time of $T_2-T_1$. The charge time (via the opening and closing of switch 132) may be controlled based on a clock signal from the timer 146. System 100 may use any suitable charge time for capacitor 130, e.g., 625 ns used in the example below.

An example implementation of system 100 may be configured as follows. For this example implementation, two equations apply:

$$I = C * \left(\frac{V}{T}\right), \quad \text{(Eq. 1)}$$

where I is current, C is capacitance, V is voltage, and T is time;

$$I = 40 * K,\qquad(\text{Eq. 2})$$

where 40 is 40 nA per degree K (slope), and K is the temperature in Kelvin.

At −40° C. (Celsius) the current is I=40(273−40) or 9.32 microamperes (µA) from Equation 2. For Equation 1 use: C=5 picofarads (pF), V=0.2 volts (V), and T=625 nanoseconds (ns). Therefore I=1.6 µA. From Equations 1 and 2 there are two different values for I, 1.6 µA and 9.32 µA. The 9.32 µA current may be supplied by the PTAT 120 (FIG. 1). The difference may be taken care of by the ZTAT 122 (FIG. 1) set to 7.72 µA, so as to provide the desired current of 1.6 µA@233 K (−40 C). The final equation then is:

$$I = C * \left(\frac{V}{T}\right) + \text{offset}$$

Combining Equation 1 and 2

$$C * \left(\frac{V}{T}\right) + \text{offset} - 6 = \text{slope} * K$$

Solving for K $$K = \left(C * \frac{V}{T}\right) + \text{offset}\right) - \text{Slope}$$

Further, the resulting slope=40 nA/° C.*625 ns/5 pF=5.0 millivolts (mV)/° C. In other words, the PTAT current source 120 exhibits a voltage/temperature relationship of 5.0 mV/° C. Note temperature change per degree Centigrade is the same as the temperature change per degree Kelvin.

The example 3.3V, 12-bit ADC provides an ADC resolution of 3.3 V/4096=806 microvolts (µV)/count (CNT). Thus, the temperature resolution of this example implementation= (806 µV/CNT/(5.0 mV/° C.)=0.161° C./CNT.

It should be understood that the components discussed above are an example only. Thus, different PTAT current source and ADC components with different operational parameters may be used.

The present invention may provide one or more advantages. For example, the invention utilizes a linear relationship between current and temperature. As another example, the offset and gain can be easily adjusted to allow greater resolution of temperature. As another example, the invention may provide fast measurements, e.g., less than 2 µs. Further, the invention may have a very small or minimal die area impact (e.g., no operational amplifiers are needed for better resolution). In addition, the disclosed system may produce less noise than conventional systems. Further, the disclosed system may be easier to calibrate than conventional systems.

The present invention has been described in terms of one or more preferred embodiments, and it should be appreciated that many equivalents, alternatives, variations, and modifications, aside from those expressly stated (e.g., methods of manufacturing, product by process, and so forth), are possible and within the scope of the invention.

What is claimed is:

1. A temperature measurement system, comprising:
    a proportional to absolute temperature (PTAT) current source;
    a capacitor selectively coupled to the PTAT current source by a controllable switch, wherein the switch is controllable to decouple to capacitor from the PTAT current source such that a voltage across the capacitor remains constant;
    a controller coupled with a timer and configured to control the switch to couple the capacitor to the PTAT current source for a charging time determined by the timer, wherein the capacitor is charged to a voltage during the charging time;
    an analog-to-digital converter (ADC) having an input coupled to the capacitor, and configured for generating a digital representation of the voltage across the capacitor after the capacitor has been charged for the charging time determined by the timer and decoupled from the PTAT current source; and
    an electronic circuit configured to calculate a temperature based on the digital representation of the voltage on the capacitor.

2. The temperature measurement system of claim 1, further comprising a current mirror to increase the current available from the PTAT current source.

3. The temperature measurement system of claim 1, further comprising a current mirror to adjust a temperature coefficient of the PTAT current source.

4. The temperature measurement system of claim 1, wherein the temperature measurement system has a temperature measurement resolution selected from any one of the group consisting of less than 1° C., less than 0.5° C., less than 0.2° C., less than 0.1° C., and less than 0.05° C.

5. The temperature measurement system of claim 1, wherein the charging time is selected from any one of the group consisting of less than 1 second, less than 100 milliseconds, less than 10 milliseconds, less than 1 millisecond, less than 100 µs, less than 10 µs, less than 1 µs, and less than 100 ns.

6. The temperature measurement system of claim 1, wherein the charging time is about 625 ns.

7. The temperature measurement system of claim 1, further comprising a shorting switch to discharge the capacitor before charging during the charging time.

8. The temperature measurement system of claim 7, wherein the controller controls the shorting switch.

9. The temperature measurement system of claim 1, further comprising a zero change to absolute temperature (ZTAT) current sink configured for adjusting a capacitor charging current to a desired value.

10. The temperature measurement system of claim 9, wherein PTAT and ZTAT currents are created by band gap circuits.

11. The temperature measurement system of claim 9, further comprising a current mirror to increase the current handling of the ZTAT current sink.

12. The temperature measurement system of claim 1, wherein the capacitor, controllable switch, controller, timer, ADC, and electronic circuit are within a microcontroller.

13. The temperature measurement system of claim 12, wherein the microcontroller comprises:
    a microprocessor; and
    a memory coupled to the microprocessor and storing a program for determining the temperature from the digital representation of the voltage on the capacitor.

14. The temperature measurement system of claim 12, wherein the microcontroller comprises the ADC and the controllable switch.

15. A method for measuring temperature, said method comprising the steps of:

providing a current from a proportional to absolute temperature (PTAT) current source;
charging a capacitor with the current from the PTAT current source for a charging time determined by a timer;
disconnecting the PTAT current source after the charging time determined by the timer has been passed such that a voltage across the capacitor is held constant for subsequent measuring;
measuring the voltage across the capacitor after the charging time determined by the timer has been passed; and
converting the measured voltage to a temperature.

16. The method according to claim 15, wherein the step of converting the measured voltage to a temperature comprises the steps of:
determining a reference voltage on the capacitor, wherein the reference voltage is equal to the current from the PTAT current source at a certain temperature multiplied by the charging time divided by a capacitance of the capacitor;
determining a current/temperature slope of the PTAT current source;
converting the current/temperature slope to a voltage/temperature slope over the charging time; and
calculating the temperature from the reference voltage and the voltage/temperature slope.

17. The method according to claim 15, further comprising the step of adjusting the capacitor charging current to a desired value with a zero change to absolute temperature (ZTAT) current sink.

18. The method according to claim 15, further comprising the step of increasing the current from the PTAT current source with a mirror current source.

19. The method according to claim 15, further comprising the step of increasing a temperature coefficient of the PTAT current source with a mirror current source.

20. An apparatus for measuring temperature, comprising:
a microcontroller comprising
 a microprocessor with memory,
 an analog-to-digital converter (ADC) having an output coupled to the microprocessor,
 a capacitor coupled to an input of the ADC,
 a first switch having a first terminal coupled to a first node and a second terminal coupled with the capacitor,
 a second switch coupled between the capacitor and a common voltage (ground),
 a switch controller coupled to the microprocessor and the first and second switches, and
 a timer coupled to the microprocessor; and
a proportional to absolute temperature (PTAT) current source coupled between a supply voltage and the first node;
wherein the first switch closes for a certain time determined by the timer and then opens;
the ADC measures a voltage across the capacitor after the certain time determined by the timer has expired and the first switch decouples the capacitor from the PTAT current source such that a voltage across the capacitor is held constant; and
the microprocessor converts the measured voltage to a temperature.

21. The apparatus according to claim 20, wherein the second switch closes and discharges the capacitor before the first switch closes.

22. The apparatus according to claim 20, further comprising a zero change to absolute temperature (ZTAT) current sink configured for adjusting a charging current provided by the PTAT current source to the capacitor.

* * * * *